United States Patent

Scharkowitz

[15] 3,665,424

[45] May 23, 1972

[54] BUFFER STORE WITH A CONTROL CIRCUIT FOR EACH STAGE

[72] Inventor: Eckhart Scharkowitz, Krailling, Germany

[73] Assignee: Siemens Aktiengesellschaft, Berlin and Munich, Germany

[22] Filed: June 29, 1970

[21] Appl. No.: 50,562

[30] Foreign Application Priority Data

July 3, 1969 Germany......................P 19 33 907.2

[52] U.S. Cl..........................340/173 R, 307/221, 315/84.5, 328/122

[51] Int. Cl........................................G11c 7/00, G11c 19/00

[58] Field of Search...................340/173 R, 173 FF, 173 RC; 307/221, 238; 315/84.5; 328/122

[56] References Cited

UNITED STATES PATENTS 3,056,112 9/1962 Lecher..............................340/173 R
2,951,230 8/1960 Cadden..............................340/173 R
3,126,524 3/1964 Blocher..............................340/173 R
3,504,353 3/1970 Guzak..............................340/173 R
3,521,245 7/1970 Rogers..............................340/173 R

*Primary Examiner*—Stanley M. Urynowicz, Jr.
*Assistant Examiner*—Stuart Hecker
*Attorney*—Hill, Sherman, Meroni, Gross & Simpson

[57] ABSTRACT

A buffer store employs a buffer control for advancing data through the buffer store until the data reaches the last or highest free data stage. The buffer control automatically advances the data by means of control stages which function as an internal clock to regenerate the clock pulse of the input apparatus, such as a computer, and the control stage of the last data stage empties the data content in accordance with the beat of the utilization apparatus, such as a magnetic tape system.

4 Claims, 2 Drawing Figures

INVENTOR
Eckhart Scharkowitz

BY Hill, Sherman, Meroni, Gross & Simpson ATTYS.

INVENTOR
Eckhart Scharkowitz

BY Hill, Sherman, Meroni, Gross & Simpson ATTYS.

BUFFER STORE WITH A CONTROL CIRCUIT FOR EACH STAGE

BACKGROUND OF THE INVENTION

1. Field of the Invention

The invention relates to a buffer store of several successively arranged buffer stages, each of which contains a storage stage of at least one storage element, in which the data are supplied to the first buffer stage and taken from the highest buffer stage and the data are automatically transferred forward from the first to the highest buffer stage not yet containing any information.

2. Description of the Prior Art

Buffer stores are connected, for example, as data buffer stores between a computer and external apparatuses, such as magnetic tape units. In one case the computer is the data source and the external device is the consumer; in the other case it is precisely reversed. As an example of an external apparatus there should be considered a magnetic tape apparatus. The writing or reading clock pulse of this tape apparatus generally does not run synchronously to the clock of the computer. The data buffer store, despite the asynchronous pulses, is to make possible the data transmission in both directions. On the other hand it should be possible in the case of simultaneous operation for on-off dispensing, that during the data transmission for writing or reading with a tape apparatus there can be accomplished a simultaneous demand or request by another external apparatus from the same computer. The tape apparatus is then further operated only after expiration of several writing or reading pulses.

In the writing on tape, the computer clock pulse transfers the data into the first buffer stage and the buffer control then shifts the data onward to in each case the highest free stage. The writing pulse of the tape apparatus picks up the data from the last stage.

The writing pulses for an information block to be written (recorded) on tape must not be interrupted. The computer pulses, if available, are requested (demanded) according to need. The buffer stages must be able to continue to supply the data consumer with data when for a few writing pulses no computer pulses are available. The buffer storer must, therefore, in the normal case, be full and the computer pulse frequency has to be greater than the writing pulse frequency of the external apparatus. Before the buffer store is entirely empty, computer pulses setting in again must deliver to in each case the last free stage. The operating course of the buffer runs in the input into the computer (reading from the tape) similarly to the above-described writing onto the tape.

Another case of use of a buffer store is the oblique course buffer store. In the writing-up of magnetic tapes with directional beat script the bits of a signal should be recorded simultaneously transversely to the band movement. The bits of a signal (character) can, however, in the writing and reading, by reason of the skews, be displaced with respect to one another over several signal intervals. In the reading the oblique course (skew) a buffer storer collects the displaced bits, for example, of a single delivered signal, in the last buffer stage. The bits of a signal (character) are not, therefore, fed simultaneously into the buffer store. They must, however, be arranged in the stages in each case full.

In all these buffers stores the data fed into the first buffer stage at the beat frequency of the data source are to advance from stage to stage to, in each case, the last free place. From the last buffer stage the data are then to be picked up at the clock frequency of the utilizing equipment. Then the data of the other buffer stages are to move up to the last buffer stage.

SUMMARY OF THE INVENTION

The primary object of the invention is to provide the buffer control in a buffer store in such a way that the data advance in a simple manner rapidly in relation to the pulses of the data source and of the data consumer and surely from the first buffer stage up to in each case the highest free buffer stage, from stage to stage, and in the event that data are delivered to the user, the data stored in the buffer stages automatically advance.

This object is realized by means that as buffer control for the generation of the clock pulses necessary for the further shifting of the data for each buffer stage there is provided at least one control stage of a bistable circuit, a coincidence circuit to the output of which there are delivered the clock pulses, and a delay circuit, that there then appears on the output of the coincidence circuit of a control stage a clock pulse for the following buffer stage when the bistable flip-flop circuit of the same control stage is set and the bistable flip-flop circuit of the following control stage is reset and that the setting of the bistable flip-flop circuit of each control stage takes place through the trailing edge of the clock pulse at the output of the coincidence circuit of the preceeding control stage and the resetting through the leading edge of the clock pulse conducted over the delay circuit of the same control stage.

A buffer stage, accordingly, comprises at least one control stage and the storage containing the storage elements. In the storage stages there can be written data only when the bistable flip-flop circuit of the appertaining control stage is not set. In order to assure the accurate data transfer from the control stage of one buffer stage to the next, the bistable flip-flop circuit of the control stage of the buffer stage can be set when the bistable flip-flop circuit in each case of the control stage of the preceeding buffer stage is reset.

The output of each coincidence circuit can be connected by way of an inverter with the input of the coincidence circuit of the control stage of the preceeding buffer stage. It is thereby achieved that the coincidence circuit of the preceeding buffer stage can be opened only when that of the following stage is closed.

For the generation of the clock pulses for a buffer stage it is necessary that the bistable flip-flop circuit of the preceeding stage be set and the bistable flip circuit of the control stage of the same buffer stage be reset.

BRIEF DESCRIPTION OF THE DRAWINGS

Other objects, features and advantages of the invention, its organization, construction and operation will be best understood from the following detailed description of an exemplary embodiment thereof taken in conjunction with the accompanying drawings, in which.

DESCRIPTION OF THE PREFERRED EMBODIMENT

Figure 1:
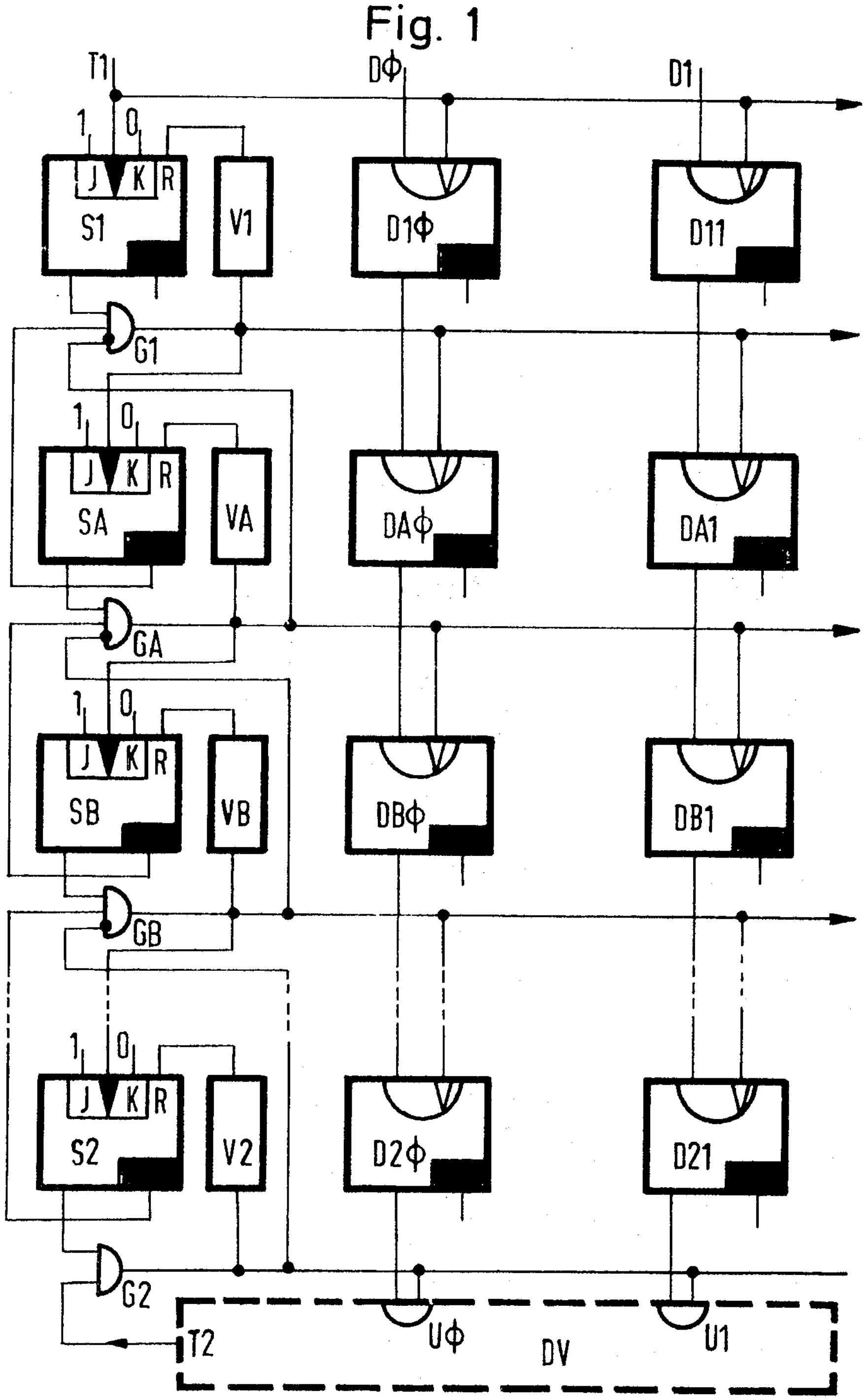
FIG. 1 is a block circuit diagram of a buffer store with the buffer storage control according to the invention.

Each buffer stage comprises a control stage and a storage stage. All the control stages together form the buffer control. As illustrated in FIG. 1, each control stage contains a bistable flip-flop circuit S, a coincidence circuit G and a delay circuit V. The storage stages contain the storage elements; in the example of execution these are the bistable flip circuits D. The modular units of the input buffer stage are designated with the index 1, the units of the output buffer stage with the index 2 and the units of the buffer stages lying in between with an index from the letters of the alphabet, A, B . . . In the input buffer stage, therefore, the bistable flip-flop circuit of the control stage is designated with S1, the delay circuit with V1, the coincidence circuit with G1, and the storage elements of the storage stage with DI0, D11, etc. The number of storage elements per stage depends on the purpose of use of the buffer storage. In the case of use as a data buffer store, the number of storage elements DI0, D11, etc. corresponds to the number of bits of a signal to be transmitted in parallel through the store.

The control stages, accordingly, are all constructed alike. The bistable flip-flop circuits S of the control stages can be executed for example, as JK master-slave flip-flops. The trigger input of the bistable flip-flop circuit of a control stage is connected with the output of the coincidence circuit G of the control stage of the preceeding buffer stage. The output of the bistable flip-flop circuit S of a control stage, which is marked in the reset state, is connected to an input of the coincidence circuit G of the control stage of the preceeding buffer stage. The other output of the bistable flip-flop circuit leads to an input of the coincidence circuit of the control stage of the same buffer stage. The delay circuit V is connected in each case between the output of the coincidence circuit of the same control stage and the reset input of the bistable flip-flop circuit of the same control stage.

The output of the coincidence circuit G of each control stage leads in each case to the clock input of the storage elements D of the following buffer stage. In the exemplary embodiment of FIG. 1 the storage elements comprises bistable flip-flop circuits with one clock input and a data input, which is connected with the output of the storage element of the storage stage of the preceeding buffer stage.

To the triggering input of the bistable flip circuit S1 of the control stage of the first buffer stage there are supplied clock pulses T1 of the data source, and likewise to the clock inputs of the storage elements D10, D11 of this buffer stage. Clock pulses T2 of the data user are supplied to the coincidence circuit G2 of the output buffer stage. The output of the coincidence circuit G2 is connected with one input each of AND-circuits U0, U1, etc. The other input of the AND-circuits U0, U1, etc. is in each case connected to the output of the storage elements of the last buffer stage. The outputs of these AND-circuits lead to the data user DV.

Figure 2:
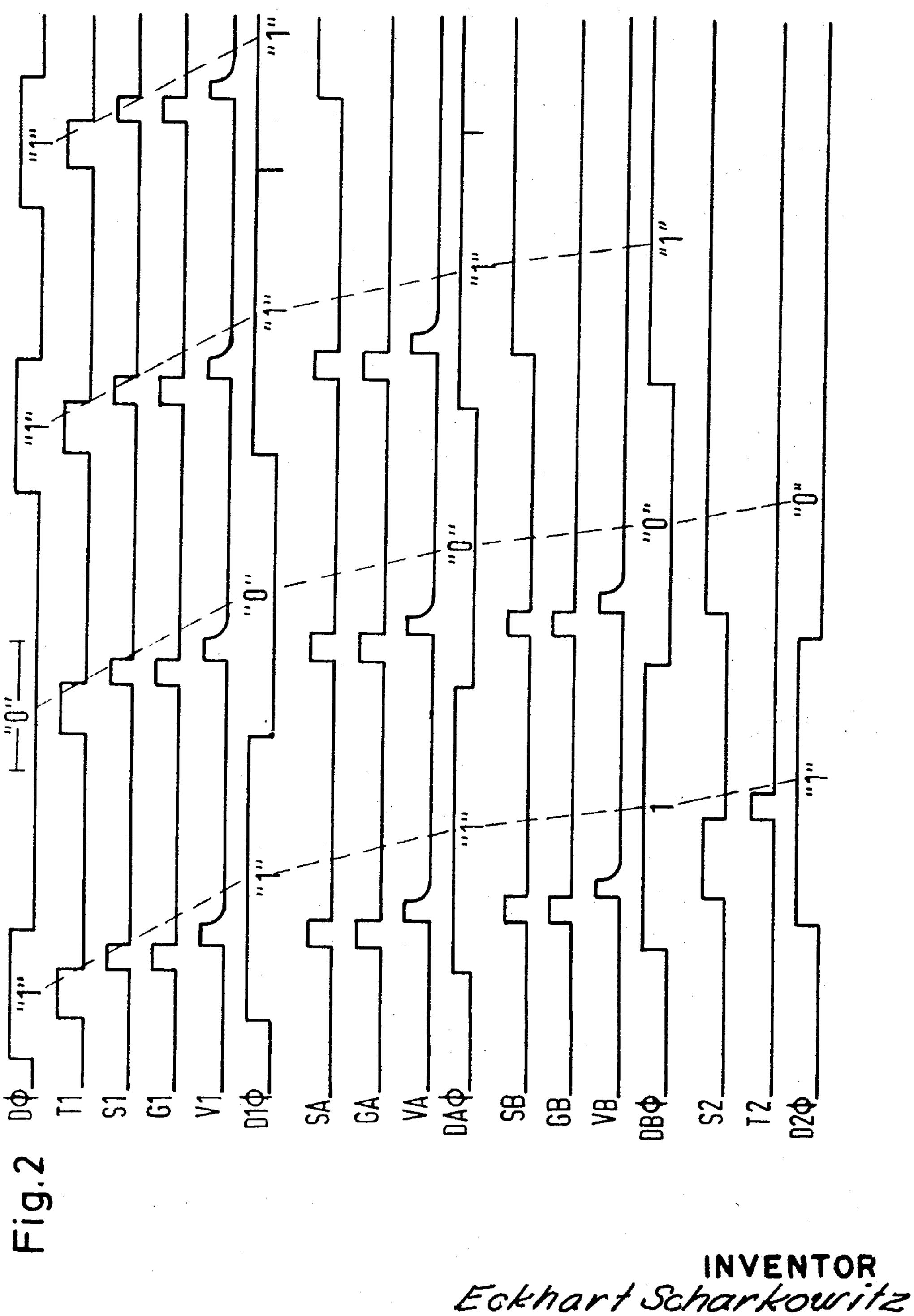
FIG. 2 illustrates a pulse chart for the operation of the buffer store of FIG. 1.

The manner of functioning of the buffer store is to be explained with the aid of the pulse chart of FIG. 2. In the chart the voltage course is identical and referenced in each case with the designation of the unit element on the output of which it appears. In the pulse chart of FIG. 2 there is shown only the operation of the first storage element of the buffer stages. The manner of functioning of the other storage elements is similar and will be abundantly clear from the following discussion.

When the data source delivers a clock pulse T1, then with the positive flank of this clock pulse data are taken over into the storage element D10. The trailing edge of the beat pulse T1 sets the bistable flip-flop circuit S1 of the control stage. Since the bistable flip-flop circuit SA is reset and thereby the coincidence circuit GA is blocked, the coincidence G1 is opened. The pulse appearing at the output of the coincidence circuit G1 now fulfills three functions:

1. Through its leading edge the data bit stored in the storage element D10 is transferred over onto the storage element DA0.

2. The leading edge is given delayed over the dealy circuit V1, to the reset input R of the bistable flip-flop circuit S1.

3. By reason of the resetting of the bistable flip-flop circuit S1 the coincidence circuit G1 closes. The trailing edge resulting from this at the output of the coincidence circuit G1 sets the bistable flip-flop circuit SA of the control stage of the following buffer stage. Then, however, the coincidence GA is opened and the data bit from the storage element DA is transferred over into the storage element DB0, the bistable flip-flop circuit SA, after the delay time given by the delay circuit VA and thereby the coincidence GA is again closed. The trailing edge of the signal at the output of the coincidence circuit GA then sets the bistable flip circuit SB of the next buffer stage. This process continues until the data bit has reached the storage element D20 of the last buffer stage. Then the appertaining bistable flip-flop circuit S2 is set. As long as the information remains in the storage element D20 and is therefore not picked up by the data user the bistable flip-flop circuit S2 remains set. The coincidence circuit GB of the preceding stage then remains blocked. Clock pulses cannot pass from the output of the coincidence circuit GB onto the clock input of the storage element of the last buffer stage; therefore, the data bit that is stored in the preceeding stage cannot be transferred forward. The next information item delivered from the data source can be forwarded only into the buffer stage preceeding the last buffer stage. In this manner, the buffer store is gradually filled.

If the data user wants to call off the data stored in the last buffer stage, it gives a beat pulse T2 to the input of the coincidence circuit G2. Since data are written into the last buffer stage, the bistable flip-flop circuit S2 of the control stage is set. Thereby, through the beat pulse T2, the coincidence circuit G2 is opened, the pulse standing on the output opens the AND-circuits U0, U1 etc. so that the data bits stored in the last stage can be transferred into the user, a magnetic type device for example. After the delay time given by the delay circuit V2, the bistable flip circuit S2 is reset. If there are data in the storage elements of the preceeding buffer stage, then the bistable flip-flop circuit S of the preceeding control stage is set, and with the resetting of the bistable flip-flop circuit S2 of the control stage of the last buffer stage the coincidence circuit of the preceeding control stage is opened so that the data of the storage elements of the preceeding buffer stage are shifted into the storage elements of the last buffer stage. This process now continues until all of the data are moved up.

If the buffer store according to the invention is constructed as a data buffer store, then in each buffer storer stage there is required per storage stage only one control stage. If, however, it is used as skew buffer storer, then there is required a control stage per storage element in each storage stage. Then each track on the magnetic tape has an individual buffer control assigned thereto.

The execution of the storage elements through bistable flip-flop circuits is not absolutely necessary. What is necessary is only that the storage elements be controlled by a clock pulse.

Many changes and modifications of this invention may become apparent to one skilled in the art without departing from the spirit and scope of the invention and it is to be understood that I intend to include within the patent warranted thereon all such changes and modifications as may reasonably and properly be included within the scope of my contribution to the art.

I claim:

1. A buffer store comprising a plurality of successively arranged buffer stages, each of said buffer stages including at least one data storage stage having a data input, a clock pulse input, and an output connected to the data input of the data storage stage of the next successive buffer stage, and a control circuit including means having a clock pulse input connected to the clock pulse input of the corresponding data storage stage and operable in response to a clock pulse to generate a clock pulse, said means including a bistable flip-flop circuit having a clock input, a reset input, a set output and a reset output, a coincidence circuit having a first input connected to said set output of said bistable flip-flop circuit, a second input connected to the reset output of the next successive control circuit, and an output, and a third input connected to the output of the coincidence circuit of the next successive control circuit, a delay circuit connected between said output of said coincidence circuit and said reset input of said bistable flip-flop circuit, and said output of said coincidence circuit connected to the clock input of the next successive buffer stage, whereby data automatically advances forward through the buffer store to the highest data-free buffer stage.

2. A buffer storer according to claim 1, comprising an additional buffer stage as the last buffer stage including a last control circuit which comprises a last bistable flip-flop circuit having a clock input, a reset input, a set output, and a reset output, a coincidence circuit having an output, a fourth input connected to the set output of said last bistable flip-flop circuit and a fifth input for connection to a clock pulse supply of external data utilization equipment, and a last delay circuit connected between the output of said last coincidence circuit and the reset input of said last bistable flip-flop circuit.

3. A buffer storer according to claim 1, comprising in each said control circuit an inverter interposed between said output of said coincidence circuit and said third input of the preceeding coincidence circuit.

4. A buffer storer according to claim 1, wherein each of said bistable flip-flop circuits comprises a master-slave flip-flop.

* * * * *

UNITED STATES PATENT OFFICE

CERTIFICATE OF CORRECTION

Patent No. 3,665,424 Dated May 23, 1972

Inventor(s) Eckhart Scharkowitz

It is certified that error appears in the above-identified patent and that said Letters Patent are hereby corrected as shown below:

Column 2, line 67 read "D10" as --D1Ø--;
line 70 read "D10" as --D1Ø--;
Column 3, line 22 read "D10" as --D1Ø--;
line 26 read "U0" as --UØ--(each occurrence);
line 41 read "D10" as --D1Ø--;
line 48 read "D10" as --D1Ø--;
line 49 read "DA0" as --DAØ--;
line 58 read "DB0" as --DBØ--;
line 64 read "D20" as --D2Ø--;
line 66 read "D20" as --D2Ø--.

Signed and sealed this 6th day of March 1973.

(SEAL)
Attest:

EDWARD M.FLETCHER,JR.
Attesting Officer

ROBERT GOTTSCHALK
Commissioner of Patents

ORM PO-1050 (10-69)

USCOMM-DC 60376-P69
* U.S. GOVERNMENT PRINTING OFFICE : 1969 O—366-334